2,856,413
METHOD FOR PREPARING GLYCIDOL

John David Malkemus and Vernon Arthur Currier, Austin, Tex., and John Barr Bell, Jr., Little Silver, N. J., assignors to Jefferson Chemical Company, Inc., Houston, Tex., a corporation of Delaware No Drawing. Application July 23, 1956
Serial No. 599,357

9 Claims. (Cl. 260—348)

This invention relates to the preparation of glycidol, and in particular, relates to a method of producing glycidol by means of the decomposition of glycerin carbonate.

In accordance with this invention, glycerin carbonate is reacted or heated in the presence of a minor amount of a metal salt resulting in the production of glycidol. The course of this reaction, which involves the conversion of glycerin carbonate to glycidol and carbon dioxide, is indicated by the following equation:

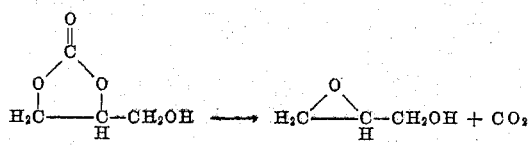

It is known to prepare glycidol from a mixture consisting of glycerin and a carbonate, such as ethylene carbonate (U. S. 2,636,040). In accordance with one such method, yields of glycidol have been obtained in the order of about 60% of theory.

It has now been discovered that very high yields of glycidol can be obtained by reacting the compound glycerin carbonate in the presence of minor amounts of a metal salt. Thus, for example, yields of pure glycidol in the order of about 80 to 90% of theory have been obtained by this process.

A large number of metal salts may be employed to promote the decomposition of glycerin carbonate to glycidol. Among these, the salts having their anions selected from the group consisting of phosphate, pyrophosphate, chloride, bromide, acetate, carbonate and bicarbonate are to be preferred. Another preferred group of salts consists of those having their cation components selected from the alkali and alkaline earth metals. Salts which have been tested and which fall within both of the aforementioned preferred groups include lithium chloride, sodium bromide, sodium chloride, sodium acetate, sodium carbonate, sodium bicarbonate, trisodiumphosphate, disodium hydrogen phosphate, sodium dihydrogen phosphate, tetrasodium pyrophosphate, lithium carbonate, calcium carbonate, and potassium carbonate. Other suitable salts include barium chloride, barium acetate, potassium chloride, potassium phosphate and the like.

Only a minor amount of the metal salt is necessary to promote the conversion of the glycerin carbonate. Thus, about 0.001 to 1% by weight of the metal salt based on the glycerin carbonate has generally proven to be satisfactory.

The function of the metal salt in the conversion reaction is not well understood. Because only small amounts are required, it has been postulated that the metal salt catalyzes the conversion reaction. During the development of the process, it was also discovered that the reaction proceeds best when the reactants are in a relatively neutral condition. From this knowledge, it has been determined that the conversion reaction should be conducted while maintaining the glycerin carbonate in a pH range between about 5 to about 8, preferably in the pH range about 6 to 7. It will be understood that the pH value represents the logarithm of the reciprocal of the hydrogen ion concentration and that according to this system a pH value of 7 represents a neutral condition.

The process of this invention may be conducted in various ways. For example, the glycerin carbonate may be heated under reaction conditions during the addition of a suitable quantity of the metal salt. In another method of operation, namely the continuous flow method, it is contemplated that the metal salt may be dissolved or suspended in the glycerin carbonate and that this mixture be continuously introduced into a reaction zone. In still another manner of operation, it is contemplated that the metal salt may be suspended, either as a solid or supported by another body, in a heated reaction tower and the glycerin carbonate converted by passing it through the tower under reaction conditions.

The reaction is generally conducted at an elevated temperature in the range 125–275° C., preferably between 175–225° C. While this reaction may be effected at atmospheric pressure, it is highly desirable to conduct the conversion at reduced pressures generally in the range of about 1 to about 100 mm. of mercury absolute.

The following examples illustrate the practice of this invention. The proportions are expressed as parts by weight.

Example I

A reaction mixture consisting of 0.24 part of trisodium-phosphate, 236 parts of glycerin carbonate (98.6% assay) and 15 parts of a glycerin carbonate recycle fraction was prepared and introduced into a dropping funnel. The reaction zone was evacuated to a pressure of about 20 mm. (millimeters) of mercury absolute, heated and maintained at a temperature between about 200–225° C. The feed mixture was gradually introduced into the reaction zone in order to maintain the pressure in the range 20–40 mm. of mercury. The glycidol that formed distilled under partial reflux at a head temperature of 50–100° C. 142 parts of crude glycidol were collected.

140 parts of the crude glycidol were distilled at 50–88° C. at a pressure of 1.2–2.5 mm. of mercury. 120.5 parts of purified glycidol, assay 97% pure, were collected. This represented a yield of 80% of theory based on the glycerin carbonate charged.

Example II

Glycidol was continuously prepared from a glycerin carbonate feed, consisting of glycerin carbonate which assayed 97% pure, and 0.05% by weight of sodium dihydrogen phosphate. The feed was introduced into a reaction zone in which the bottoms temperature averaged about 205° C. and the head temperature about 85° C. at a pressure of about 50 mm. of mercury absolute. After adjustment of the feed rate, 778 parts of the glycerin carbonate feed were passed through a preheater maintained at 150° C. and into the reaction zone at a rate of 125 parts per hour. After about 6.5 hours, 402 parts of glycidol assaying 97% pure were obtained. This represented an 82% yield based on the glycerin carbonate charged.

Example III

Glycerin carbonate is treated with a total amount of about 0.1% by weight of 50% caustic soda and 85% phosphoric acid in order to stabilize the glycerin carbonate at a pH of about 6.8. The treated glycerin carbonate is preheated and may then be introduced into a treating column packed with porous clay chips, which have been impregnated with disodium hydrogen phosphate and sodium dihydrogen phosphate, while the treating column is maintained at about 200° C. under a pressure in the range of 10–20 mm. of mercury. It is estimated that yields substantially in excess of about 85% of theory are obtainable by this method.

*Example IV*

263 parts of glycerin carbonate were gradually added to 0.25 part of calcium carbonate in a heated reaction flask. The reaction temperature was held in the range of 195–230° C. at a pressure about 15–72 mm. of mercury. 150 parts of crude glycidol were taken overhead. On redistillation, the yield of pure glycidol was found to be 72% of the theoretical.

When this reaction was repeated in the absence of a catalyst the conversion of glycerin carbonate proceeded at an extremely low rate. Conversion of the glycerin carbonate in the absence of a catalyst was completed at temperatures in the range 250–300° C. The yield of glycidol was substantially less than the yield obtained in the presence of a catalyst.

*Example V*

A mixture consisting of 100 parts of glycerin carbonate and 0.1% by weight of lithium carbonate based on the glycerin carbonate was heated at 210–235° C. at a pressure of 20–60 mm. of mercury. A yield of glycidol amounting to 73% of theory was obtained.

Obviously, many modifications and variations of the invention, as hereinbefore set forth, may be made without departing from the spirit and scope thereof, and therefore only such limitations should be imposed as are indicated in the appended claims.

We claim:

1. A process for producing glycidol which comprises heating glycerin carbonate at an effective conversion temperature within the range of 125–275° C. in the presence of at least about 0.001% by weight based on said carbonate of a salt selected from the group consisting of the alkali metal, and alkaline earth metal phosphates, pyrophosphates, chlorides, bromides, acetates, carbonates and bicarbonates.

2. A process according to claim 1 in which said heating is conducted at an absolute pressure between about 1–100 mm. of mercury.

3. A process according to claim 7 in which said metal salt is trisodium phosphate.

4. A process according to claim 7 in which said metal salt is sodium dihydrogen phosphate.

5. A process according to claim 7 in which said metal salt is tetrasodium pyrophosphate.

6. A process according to claim 7 in which said metal salt is calcium carbonate.

7. A process for producing glycidol in high yields which comprises charging glycerin carbonate as the starting material to a reaction zone, heating the glycerin carbonate in the reaction zone to a temperature within the range of 125–275° C. and under a subatmospheric pressure in the presence of a catalyzing amount of a salt selected from the group consisting of the alkali metal and alkaline earth metal phosphates, pyrophosphates, chlorides, bromides, acetates, carbonates and bicarbonates, and recovering from the overhead distillate from the reaction zone purified glycidol in a yield of at least 72% by weight of theoretical.

8. The method according to claim 7, wherein the salt is employed in a proportion by weight based on the glycerin carbonate within the range of 0.001 to 1.0%, and the reaction mixture within the reaction zone is maintained at an effective pH within the range of 5 to 8.

9. The method according to claim 8, wherein the salt is disodium hydrogen phosphate.

References Cited in the file of this patent

UNITED STATES PATENTS

| | | |
|---|---|---|
| 2,511,942 | Prichard | June 20, 1950 |
| 2,667,497 | Cline | Jan. 26, 1954 |

FOREIGN PATENTS

| | | |
|---|---|---|
| 1,100,845 | France | Apr. 13, 1955 |
| 845,937 | Germany | Aug. 7, 1952 |